No. 641,153.  
F. A. SEIBERLING.  
PNEUMATIC RUBBER TIRE.  
(Application filed Nov. 28. 1899.)  
Patented Jan. 9, 1900.

(No Model.)

Witnesses:  
Myrtle Dressler  
Rose Thompson

Inventor:  
Frank A. Seiberling,  
By Humphrey & Humphrey,  
attys.

UNITED STATES PATENT OFFICE.

FRANK A. SEIBERLING, OF AKRON, OHIO.

PNEUMATIC RUBBER TIRE.

SPECIFICATION forming part of Letters Patent No. 641,153, dated January 9, 1900.

Application filed November 28, 1899. Serial No. 738,557. (No model.)

*To all whom it may concern:*

Be it known that I, FRANK A. SEIBERLING, a citizen of the United States, residing at Akron, in the county of Summit and State of Ohio, have invented a certain new and useful Improvement in Pneumatic Rubber Tires, of which the following is a specification.

My invention has relation to pneumatic tires for vehicles that embody an inner closed air-tube of rubber and surrounding closed tubes of woven fabric and rubber in different order of arrangement, the rubber being closed by the process of vulcanization and caused thereby to adhere to the adjacent layer of fabric.

Difficulty has been experienced in prolonging the life of the tire from a creeping between the different layers of the tube, which results in causing them to wear rapidly internally as well as externally. The object of my invention is to overcome this difficulty and prolong the life of the tire, and another object is to provide a tire of peculiar strength and durability.

To the aforesaid objects my invention consists in the peculiar and novel construction, arrangement, and combination of parts hereinafter described and then specifically pointed out in the claims, reference being had to the accompanying drawings, forming a part of this specification.

Figure 1:
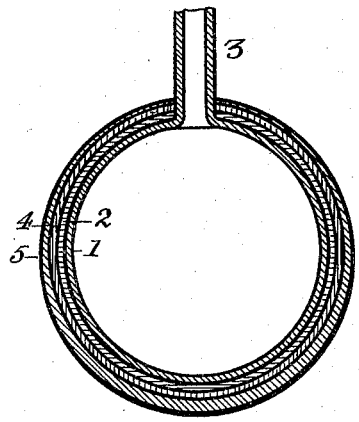
Figure 2:
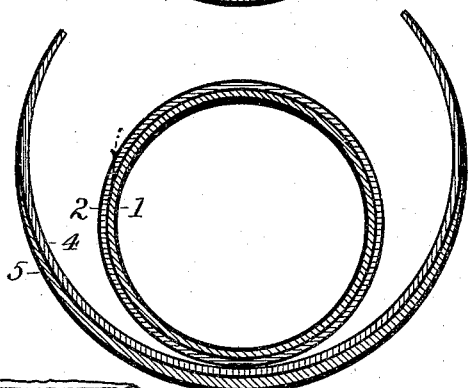
Figure 3:
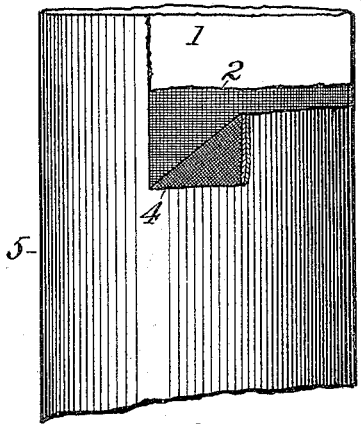

In the accompanying drawings, in which similar reference-numerals indicate like parts in the different views, Figure 1 is a cross-section of my improved tire through the valve-stem; Fig. 2, a cross-section of the same tire at a different point with the cover split and the end swung away from the inner tubes, and Fig. 3 a portion of the tire with the outer cover folded back to better illustrate the construction.

Referring to the figures, 1 is the inner closed tube of rubber surrounded by a rubber-saturated fabric 2, provided with a valve-stem 3 of the usual form. Surrounding this tube, but in no wise cohering with it, is a cover consisting of a rubber-saturated fabric 4, provided with an outer layer of rubber 5, thickest on the tread portion to take the wear of the tire, the two parts constituting an outer closed tube. The whole tire thus constructed is vulcanized at one operation, suitable material to prevent the two fabrics from uniting being interposed between them when they are built up, thus producing two distinct closed or endless tubes, one within the other and simultaneously vulcanized, the outer tube having an inner adhering layer of fabric and the inner tube having an outer adhering layer of fabric, the two fabrics being in contact, but not cohering, and both tubes of like outline in section and when completed presenting the appearance of a single-tube tire.

It will be observed that the surfaces of the two tubes which are in contact are roughened by reason of their structure, so that they are adapted for frictional engagement with each other, such frictional engagement being sufficient to practically prevent all relative movement of the two tubes.

I have heretofore described a specific embodiment of my invention which I prefer for carrying out my purposes. I do not wish, however, to be understood as limiting my invention to the precise structure set forth, as it is obvious that the frictional engagement of the two surfaces may be obtained by constructions other than the specific one above set forth.

I claim as my invention—

1. An improved pneumatic tire consisting of an inner endless closed tube with an outer adhering layer of fabric, and an outer endless closed tube of rubber with an inner adhering layer of fabric, said tubes being of like outline in section, said fabric layers being arranged to lie against each other without cohering substantially as shown and described.

2. An improved pneumatic tire consisting of an inner endless closed tube of rubber with an outer adhering layer of fabric, and an outer endless closed tube of rubber with an inner adhering layer of fabric, said tubes being of like outline in section, said fabric layers being arranged to lie against each other without cohering, and all simultaneously vulcanized, substantially as described.

In testimony that I claim the above I hereunto set my hand.

FRANK A. SEIBERLING.

In presence of—
ELCIE M. PENFIELD,
C. P. HUMPHREY.